July 6, 1965   E. A. VERRINDER ETAL   3,193,527
PROGRAM-CHAIN SWITCH OPERATOR FOR ARTICLE HANDLING APPARATUS
Filed Dec. 26, 1962   3 Sheets-Sheet 1

INVENTORS
ERNEST A. VERRINDER
FRANCIS CURTIS
BY
ATTORNEY

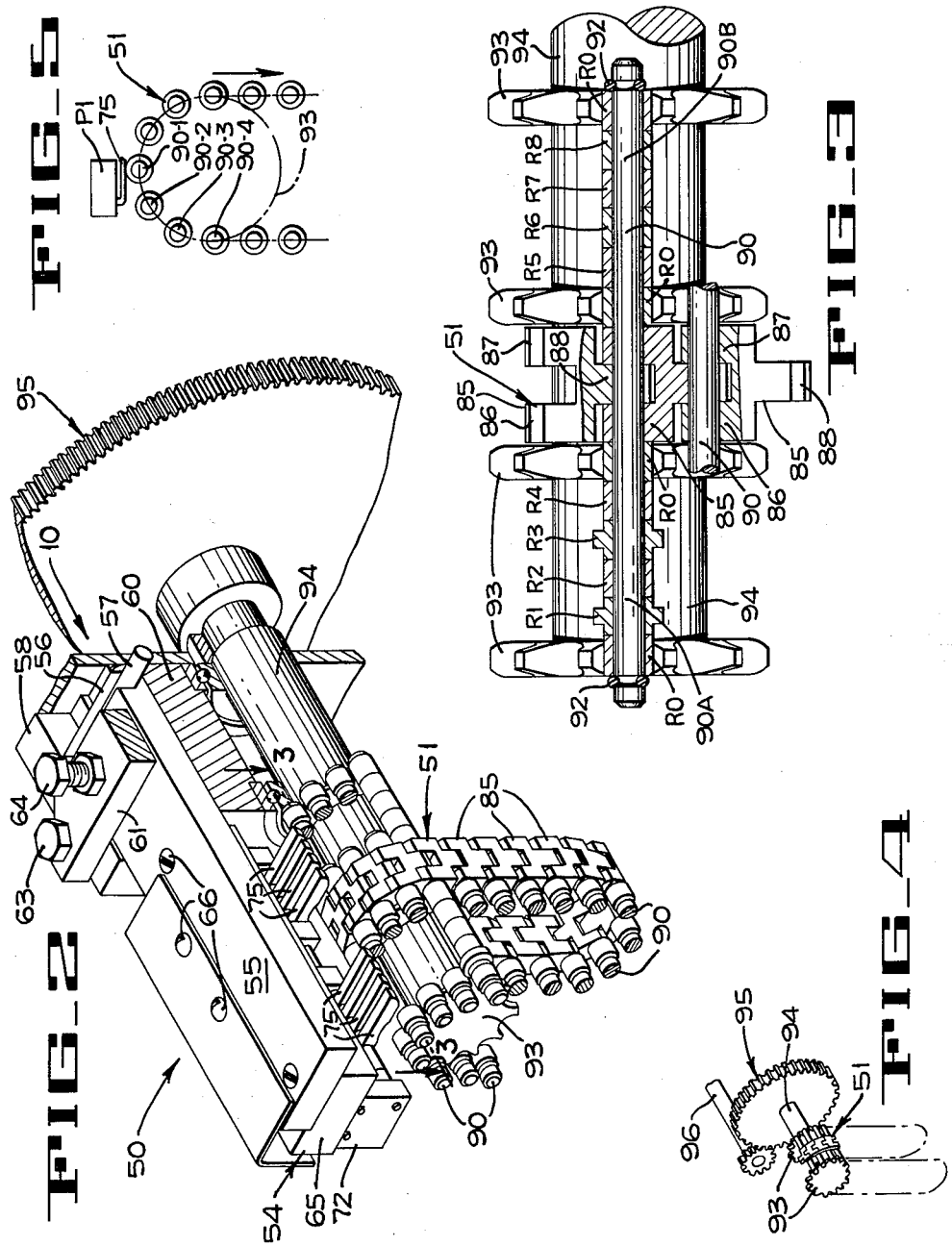

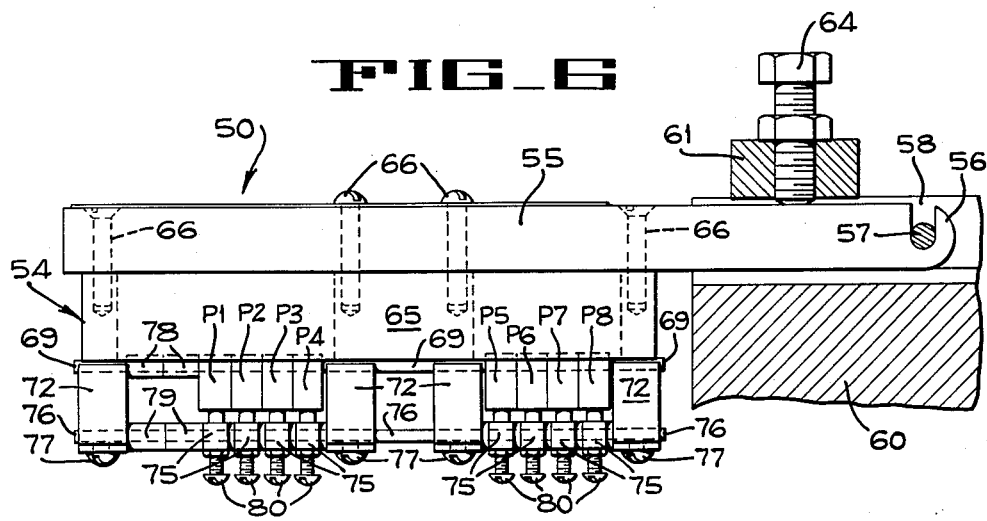
FIG_6
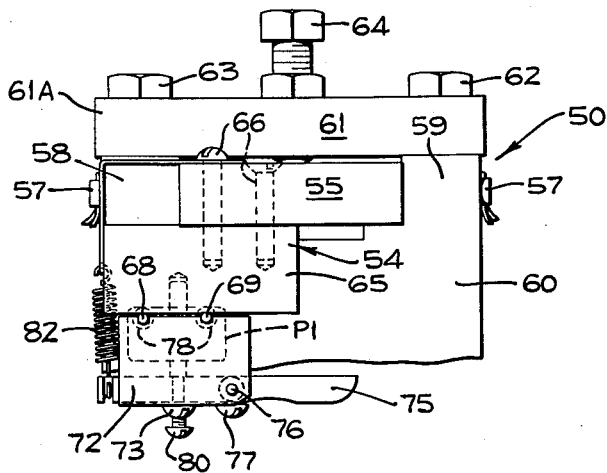
FIG_7

United States Patent Office 3,193,527
Patented July 6, 1965

3,193,527
PROGRAM-CHAIN SWITCH OPERATOR FOR ARTICLE HANDLING APPARATUS
Ernest A. Verrinder and Francis Curtis, Riverside, Calif., assignors to FMC Corporation, San Jose, Calif., a corporation of Delaware
Filed Dec. 26, 1962, Ser. No. 247,143
10 Claims. (Cl. 209—46)

This invention pertains to article handling apparatus, and more particularly concerns an improved programming mechanism for a machine adapted to arrange articles on pallets.

Since palletizing machines must be capable of handling packages of different sizes and of arranging packages in various patterns to form stable layers, it is necessary to provide means for changing the settings of the various operating mechanisms. Heretofore, variable means have been provided at each mechanism so that a plurality of changes had to be made to effect a changeover. When a single programming device has been provided, it has been very complicated, including complex electrical circuits and counters which are difficult to keep in operating condition and which require skilled technicians for changing the settings.

An object of the present invention is to provide a program mechanism that is extremely simple in construction and which has means for quickly making changes in the settings.

Another object is to provide a program device, the settings of which can be changed by a relatively unskilled operator.

Another object is to provide a program device including a novel switch arrangement and a unique switch actuator unit.

Other and further features and objects of the invention will be apparent from the following description taken in connection with the accompanying drawings, in which;

FIGURE 2 is a fragmentary perspective, particularly showing the program chain of the present invention and its drive mechanism.

FIGURE 3 is an enlarged, generally horizontal section taken substantially on line 3—3 of FIG. 2.

FIGURE 4 is a schematic perspective of the program chain drive mechanism.

FIGURE 5 is a fragmentary diagrammatic end elevation of the program chain, particularly showing the cooperation of the chain with the switches which it operates.

FIGURE 6 is an enlarged side elevation of the switch assembly used in the program device of the present invention.

FIGURE 7 is an end elevation of the switch assembly of FIG. 6.

Figure 1:
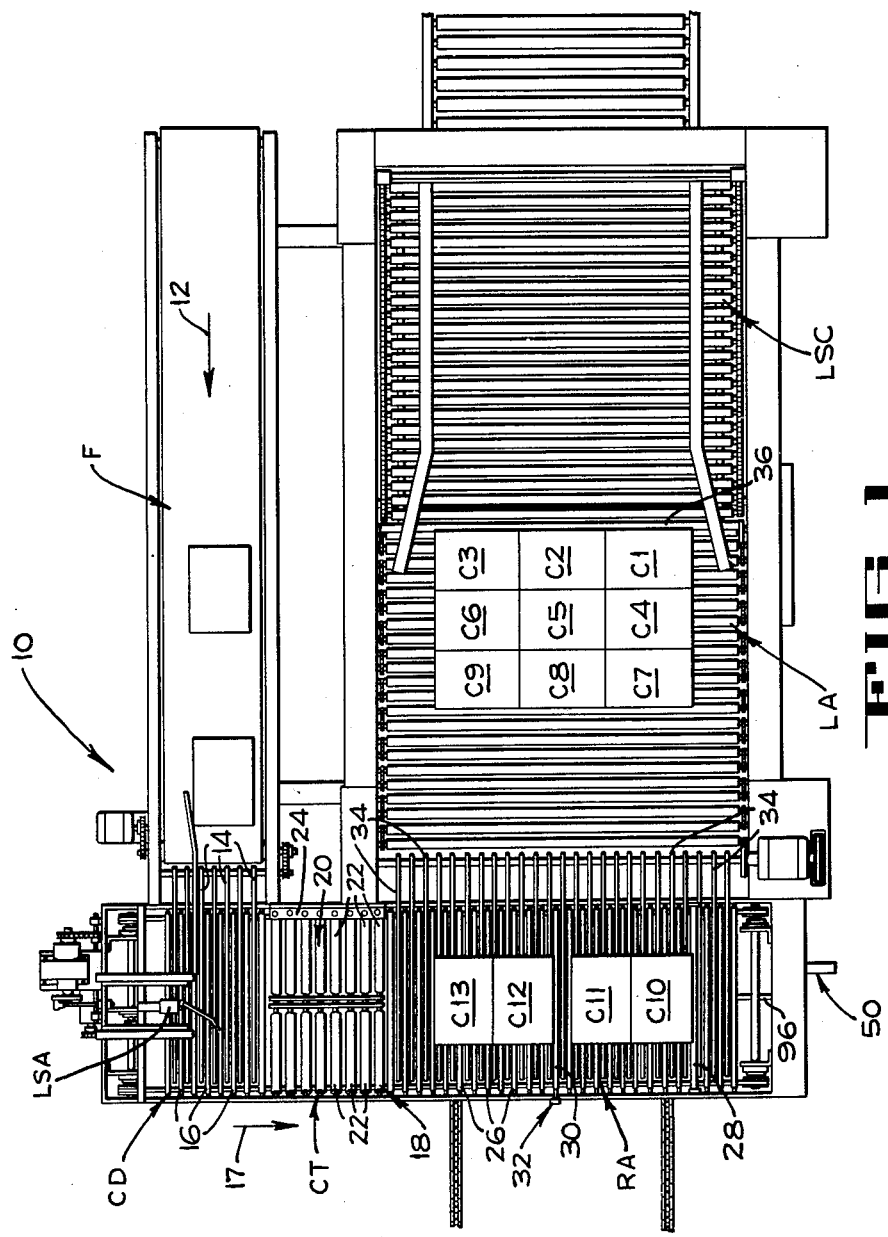
FIGURE 1 is a digrammatic plan of a palletizing machine in which the program device of the present invention can be used.

The palletizing machine 10 (FIG. 1), which has been chosen to illustrate one type of machine that can be controlled by the program chain of the present invention, is of the type disclosed in the application of Ernest A. Verrinder, filed of even date herewith. Since the present invention concerns a program chain, a detailed description of the entire machine 10 will not be given, it being understood that reference may be had to said application for details of construction and operation not mentioned herein. In general, machine 10 includes a feed conveyor FC on which articles, such as cases, are moved one-by-one in the direction of the arrow 12 into a case diverter CD. Each case is carried into the case diverter on a plurality of elevated belts 14 which are lowered to deposit the case on a plurality of rollers 16 that are rotating in a direction to advance the case in the direction of arrow 17. The case passes over a case turner CT which has two sets 18 and 20 of rollers 22 that are rotating in the same direction as rollers 16. Depending on the setting of the program device of the present invention, the case turner will advance each case onto a row accumulator conveyor RA without changing the orientation of the case, or it will rotate the case 90° before it advances the case onto the row accumulator. To effect the case-turning operation, roller set 20 is mounted in a vertically movable frame so that, when the frame is raised, one end of each of the rollers of set 20 will engage a brake mechanism 24 and the rotation of these rollers will be arrested. The rollers of set 18 will continue advancing the case and will cause the case to rotate 90°, using the stationary rollers of set 20 as fulcrums. When the case is thus reoriented, it will advance onto the row accumulator conveyor RA. Therefore a row of cases having their original orientation, as cases C10–C13, or a row having a new orientation, as cases C1–C3, can be formed depending upon the setting of the program device.

The row accumulator conveyor RA includes a plurality of parallel rollers 26 that are rotated in the same direction as rollers 16 and 22 and are adapted to advance the first case of a row into abutting contact with a fixed roller 28 which is parallel to rollers 26 but is spaced above the surface of those rollers. Each following case of the row of cases is moved into engagement with the preceding case until a row is formed.

It is desirable at times to provide a gap between cases in a row, as shown between cases C11 and C12 of FIG. 1 in order that, when the row is added to other rows to form a layer, the layer will have a symmetrical arrangement that will increase the stability of a load made up of several layers of cases. In order to obtain a gap between cases, a vertically movable stop bar 30 is mounted between selected rollers of the row accumulator conveyor. This stop bar 30 normally is at the same elevation as, or slightly below the elevation of the rollers 26. A lifting mechanism 32 is arranged to raise one end of the bar 30 into the path of a case moving along the conveyor RA if said lifting mechanism receives a signal from the program device of the present invention. Thus, depending upon the setting of the program chain, a row of abutting cases or a row of cases having a gap therein may be formed.

When a row of cases has been formed, it is discharged laterally onto a layer accumulator conveyor LA by means of a plurality of belts 34 which are disposed between the rollers 26 of the row accumulator conveyor, the upper runs of said endless belts being normally disposed below the level of the conveying surfaces of the rollers 26. The belts are mounted on a frame that can be pivoted upwardly to raise the belts 34 which lift the cases off the rollers 26 and convey the cases to the layer accumulator LA. Since it is not necessary to raise the belt-carrying frame until the formation of a row of cases has been completed, the raising of the frame is under the control of the program device of the present invention so that the raising of the frame will take place only at desired intervals in the layer-forming operation.

As seen in FIG. 1, the first row of cases C1–C3 are moved into abutment with a stop bar 36 which is disposed at the forward edge of the layer accumulator conveyor. Each following row of cases comes to rest against a preceding row until a complete layer is formed. When the layer is formed, the stop bar 36 is swung downwardly to permit the layer of cases to be moved onto a layer stripper carriage LSC. Since the release of the layer depends upon the number of cases making up the layer, means is provided in the program device for effecting release of the layer when the correct number of cases have been assembled in a layer and for changing the setting so that layers having different numbers of cases can be processed.

The program device of the present invention is made up of two parts, a switch mounting unit 50 and a program chain 51. The mounting unit comprises a composite switch support arm 54 having an upper member 55 which has a hook 56 formed at one end, said hook being arranged to receive a pivot pin 57 fixed in two spaced mounting members 58 and 59 (FIG. 7) carried by a block 60 that is adapted to be secured to a side plate of the machine 10. A hold down bar 61 is pivoted at 62 to member 59 and is locked in position overlying the member 55 by a shoulder screw 63 that engages a hooked end 61A of the hold down bar. A setscrew 64 is threaded through the bar 61 and engages the upper surface of the member 55 to hold that member, and the switches mounted thereon in fixed position. The composite support arm 54 includes a switch mounting plate 65 (FIG. 1) which is secured by screws 66 to the member 55. A plurality of switches P1–P8 are slidably disposed on two rods 68 and 69 (FIG. 7) that are locked in position against the underside of the mounting plate 65 by four clamping blocks 72, each block being secured to the mounting plate 65 by a capscrew 73. Each switch has an actuator arm 75 pivoted on a rod 76 that extends through aligned openings in the clamping blocks 72 and is secured therein by setscrews 77. In FIG. 6 it will be seen that two spacer sleeves 78 are disposed on the rods 68 and 69 and two spacer sleeves 79 are disposed on the rod 76 between switch P1 and the adjacent clamping block. It will be evident that, if less than eight switches are to be used, the excess switches can be removed from the unit and replaced by spacer sleeves. An adjusting screw 80 is threaded through each actuator arm 75 and is arranged to engage a push rod or the like for controlling the closing or opening of contacts inside the switch. In one arrangement, the screw may engage a push rod in the switch to hold certain contacts open. Then, when the actuator arm 75 of the switch is engaged and pivoted counterclockwise against the resistance of a spring 82, the screw moves downwardly and allows the contacts to close.

The program chain 51 comprises a plurality of connector links 85 (FIGS. 2 and 3) each of which has a yoke portion, defined by arms 86 and 87, and a third arm 88. The third arm 88 of one link is disposed between the arms 86 and 87 of an adjacent link, and aligned holes in all three arms receive a mounting or switch control rod 90 which has two portions 90A and 90B projecting for substantially equal distances in opposite directions from the associated connector link 85. Twelve rollers, including rollers R1–R8 and four rollers R0, are mounted on each rod and, accordingly, the rollers define columns on the chain, that is, all rollers R1 define a first column, all rollers R2 define a second column, and so forth. O-rings 92, of rubber or suitable synthetic material, lock the twelve rollers on the control rod.

The four rollers, indicated by reference letter R0, are identical cylindrical rollers and are adapted to fit between the teeth of four sprockets 93 that are secured to a shaft 94 which is intermittently driven through a gear mechanism 95 (FIG. 4) from a camshaft 96, that is part of the machine 10 and is described in the above-mentioned Verrinder application. Whenever a case entering the machine actuates a switch LSA (FIG. 1), the camshaft 96 is rotated one complete revolution. The gear mechanism is such that one revolution of the camshaft 96 will cause the chain to be moved through sprockets 93, relative to the switches P1–P8, a distance equal to the distance between adjacent control rods 90 on the program chain.

In FIG. 3 a control rod is shown having rollers R2, R4 and R5–R8 that are identical to roller R0 while rollers R1 and R3 are of enlarged diameter. The diameter of the rollers is so chosen that only the large rollers, such as rollers R1 and R3 will actuate the associated switches when they are moved thereunder, the smaller rollers being too small to engage the switch actuator arms 75.

Since eight columns of rollers are provided and each column is aligned with one of the switches, eight control operations can be provided for in the chain 51 however, it will be understood that larger chains having longer control rods 90 could be provided so that additional operations can be controlled and coordinated by program chains constructed in accordance with the teachings of this invention.

In the machine of FIG. 1, four control operations must be coordinated by the program chain, namely, the actuation of the case turner CT, the raising of the gap-forming stop bar 30, the raising of the row diverting belts 34, and the lowering of the layer release stop bar. The mechanisms that control the actuation of these units are substantially identical and each mechanism includes a cam follower (not shown) which engages a cam on the above-mentioned camshaft 96 and a solenoid which, when energized, makes the cam follower capable of reacting to the configuration of the associated cam. Accordingly, to arrange the chain for controlling these four operations, column No. 1 which is formed on the chain by rollers R1 is assigned to the case turning operation, and the contacts of switch P1 are connected to the solenoid associated with the case turning mechanism. Column No. 2, that is formed by rollers R2, is assigned to the gap-forming stop bar 30 and the contacts of switch P2 are connected in the circuit of the solenoid associated with the mechanism for raising the stop bar. Column No. 3, consisting of rollers R3, is assigned to the row diverter belt 34 and the contacts of switch P3 are connected in the circuit of the solenoid associated with the belt raising mechanism. Column No. 4, consisting of rollers R4, is assigned to the layer release bar 36, and switch P4 is connected in the circuit of the solenoid associated with the bar lowering mechanism. Since only four operations are to be controlled, the columns formed by rollers R5–R8 will not be used. Each control rod 90 is assigned to a separate case, as indicated in FIG. 5, rod 90–1 being assigned to case C1, rod 90–2 being assigned to case C2, rod 90–3 being assigned to case C3; and so forth. Then, if case C1 is to be rotated 90°, roller R1 on control rod 90–1 will be a large roller capable of actuating switch P1 to energize the case turning solenoid. Since the first case in any row should cause a row, that has been previously formed on the row accumulator, to be discharged therefrom, roller R3 on control rod 90–1 should also be a large roller. All other rollers on rod 90–1 can be small rollers. Similarly, the rollers R1 on the control rods associated with cases C2–C9 should be large rollers to actuate the case turning mechanisms, and rollers R3 on cases C4, C7 and C10, the leading cases of their respective rows, should be large rollers to effect the discharge of previously formed rows from the accumulator conveyor. If a gap is to be formed between a particular case, as between case C12 and its preceding case, the roller R2 on the control rod assigned to that case should be a large roller to actuate switch P2 and effect the raising of the stop bar 30 in front of the case. The second case in each layer should cause the discharge of a previously formed layer on the layer accumulator conveyor LA. Accordingly, in the present example, the roller R4 on the control rod 90–2 should be a large roller. Thus, it will be evident that, when each case actuates switch LSA, the switches P1–P4, that are engaged by large rollers on the associated control rod, will energize associated solenoids to initiate control operations that are completed by cams on the camshaft 96. As the chain is moved to its next position, the large rollers on the next control rod engage the switches P1–P4.

The program chain may have as many control rods 90 as desired. It is desirable that the number of rods corresponds to the number of cases in a complete sequence of operations so that, when the sequence is complete, the control rod associated with the first case of the sequence will be disposed under the switches P1–P4 so that the chain is ready to repeat the sequence.

When a change in the settings of the program chain is to be made, the set screw 64 and the shoulder screw 63 are backed off, permitting the hold-down bar 61 to be pivoted away from its position overlying the switch support arm 54. The arm 54 is pivoted upwardly about pivot pin 57, and the chain can then be lifted bodily out of engagement with the sprockets 93. To replace or relocate rollers on each control rod, it is only necessary to remove the O-rings 92 on the control rod. If the program chain is to be shortened or lengthened, control rods and associated connector links 85 can be removed or added.

From the foregoing description, it will be apparent that the present invention provides a program chain that can be quickly converted from an arrangement adapted to control one sequence of operations to an arrangement adapted to control a completely different sequence of operations. Further, the necessary changes can be made by a relatively unskilled operator since all that the operator needs to know to set up this program chain is the number of the column assigned to each operation and the number of the control rod assigned to each case. While it is not necessary to remove unused switches, it will be evident that the particular switch mounting disclosed herein makes such removal particularly easy.

It will be understood that modifications and variations may be effected without departing from the scope of the present invention as defined by the claims appended hereto.

We claim:

1. In a program device, a plurality of connector links disposed end to end, each link having a portion overlapping a portion of the two adjacent links, the overlapping portions of adjacent links having aligned apertures, a control rod disposed in each set of aligned apertures, a plurality of switch actuators slidably disposed on each control rod, and a removable retainer engaging each control rod and abutting the actuator farthest from the associated connector link to lock said actuators on said rod, each switch actuator being disposed the same distance from said link as an actuator on each adjacent control rod, whereby endless columns of switch actuators are formed.

2. In a program device, a plurality of links disposed end to end, each link having a portion overlapping a portion of the two adjacent links, the overlapping portions of adjacent links being provided with aligned apertures, a control rod disposed in each set of aligned apertures, a plurality of switch actuators slidably disposed in side by side relation on each control rod, and a removable retainer member on each rod locking the actuators thereon, said switch actuators being of uniform width whereby each switch actuator on a particular control rod is disposed in alignment with a switch actuator on each adjacent rod whereby columns of actuators are formed with the switch actuators in each column being disposed the same distance from their associated connector links.

3. In a program device, a support member, a shaft journalled in said support, a plurality of sprockets on said shaft, an endless carrier chain positioned over said shaft with portions of said chain adapted to be placed in driven engagement with said sprockets, said chain comprising a plurality of connector links, disposed end-to-end, one end of each link being in the form of a yoke having spaced arms and the other end comprising an arm projected between the arms of the yoke of an adjacent link to form a series of three side-by-side arms, means defining a passage through each group of three side-by-side arms, a carrier rod slidably disposed in each passage and projecting to opposite sides of the associated links, a plurality of switch actuators and space fillers slidably disposed on each rod, and an O-ring secured to each rod adjacent the end thereof to hold said switch actuators, and space fillers on said rod.

4. In a program device, a plurality of switches disposed side-by-side to form a line of switches, a shaft disposed parallel to and adjacent said line of switches, a plurality of sprockets secured to said shaft for rotation therewith, a program chain including a plurality of carrier rods, each carrier rod having a plurality of side-by-side mounting areas, each area being aligned with one of said switches and receiving either a generally cylindrical switch actuator capable of actuating the aligned switch when moved into proximity thereto or a space filler incapable of actuating the switch, each switch actuator and space filler being slidable along said shaft to its assigned area, removable means locking said actuators and fillers on said rod, and means establishing driving engagement between said sprockets and said chain whereby said chain is movable during rotation of said shaft to move each carrier successively into proximity to said line of switches.

5. In a program device, a rotatable shaft, a plurality of sprockets secured to said shaft, a program chain in driven engagement with said sprockets, said chain including a plurality of equally-spaced transverse mounting rods, switch actuators removably mounted on said rods and formed in columns disposed in planes normal to said shaft, a switch support member mounted for pivoting movement from a position overlying said shaft to a retracted position spaced from said shaft, and a plurality of switches mounted on said support member, each switch having an arm in alignment with one of said columns whereby rotation of said shaft moves said switch actuators past the associated switches to engage the arms of said switches, said switch support member being adapted to hold said switch arms in the path of said actuators when in said overlying position and being adapted to permit disengagement of said chain from said sprockets when in said retracted position.

6. In a program device, a rotatable shaft, a plurality of spaced sprockets secured to said shaft, a program chain adapted to be disposed in driven engagement with said shaft comprising a plurality of connector links disposed end-to-end, each link having a portion overlapping a portion of each adjacent link, means defining aligned apertures in said overlapping portions, a carrier rod slidably disposed in each set of aligned apertures, a plurality of cylindrical members on each rod, the cylindrical members on each rod being spaced from each other to conform to the spacing between the sprockets on said shaft, said cylindrical members being of a size to be received between teeth of said sprockets to provide a drive connection between said chain and said shaft, a plurality of switch actuators slidably disposed on said rods in columns disposed in planes normal to said shaft, and space fillers disposed on said rods adjacent certain of said switch actuators to provide at predetermined locations in said chain members incapable of actuating switches.

7. In a program device, a plurality of connector links disposed end to end, each link having a portion overlapping a portion of the two adjacent links, the overlapping portions of adjacent links having aligned apertures, a control rod disposed in each set of aligned apertures, a plurality of switch actuators disposed for adjusting movement longitudinally on each control rod, and a removable retainer engaging each control rod and abutting the actuator farthest from the associated connector link to lock said actuators on said rod, each switch actuator being disposed the same distance from said link as an actuator on each adjacent control rod, whereby endless columns of switch actuators are formed.

8. In a program device, a plurality of switches disposed side-by-side to form a line of switches, a shaft disposed parallel to and adjacent said line of switches, a program chain including a plharity of carrier rods, each carrier rod having a plurality of side-by-side mounting areas, each area being aligned with one of said switches and removably receiving either a switch actuator capable of actuating the aligned switch when moved into proximity thereto or a space filler incapable of actuating the switch, each switch actuator and space filler being movable along said shaft to its assigned area, removable means locking said actuators and fillers on said rod, and means establishing driving engagement between said shaft and said chain whereby said chain is movable during rotation of said shaft to move each carrier successively into proximity to said line of switches.

9. In a program device, a rotatable shaft, a plurality of sprockets secured to said shaft, a program chain in driven engagement with said sprockets, said chain including a plurality of control members formed in columns disposed in planes normal to said shaft and switch actuators carried by selected ones of said control members, a switch support member mounted for pivoting movement from a position overlying said shaft to a retracted position spaced from said shaft, and a plurality of switches mounted on said support member, each switch having an arm in alignment with one of said columns whereby rotation of said shaft moves said switch actuators past the associated switches to engage the arms of said switches, said switch support member being adapted to hold said switch arms in the path of said actuators when in said overlying position and being adapted to permit disengagement of said chain from said sprockets when in said retracted position.

10. In a program device, a plurality of links disposed end to end to form an endless chain, each link having a portion overlapping a portion of the two adjacent links, the overlapping portions of adjacent links being provided with aligned apertures, a control rod disposed in each set of aligned apertures, a plurality of switch actuators movably disposed in side by side relation on each control rod, and a removable retainer member on each rod locking the actuators thereon, said switch actuators being of uniform width whereby each switch actuator on a particular control rod is disposed in alignment with a switch actuator on each adjacent rod whereby columns of actuators are formed with the switch actuators in each column being disposed the same distance from their associated connector links, means for intermittently advancing said chain a distance equal to the distance between adjacent control rods, and means mounting a plurality of switches in a line parallel to said control rods, each switch being in alignment with a column of actuators whereby advancement of said chain moves said actuators into engagement with associated switches.

References Cited by the Examiner
UNITED STATES PATENTS
2,656,109  10/53  Lindars _____ 200—46

BERNARD A. GILHEANY, *Primary Examiner.*
ROBERT K. SCHAEFER, *Examiner.*